US007981988B2

(12) United States Patent
Hyde

(10) Patent No.: US 7,981,988 B2
(45) Date of Patent: Jul. 19, 2011

(54) ULTRAVIOLET RADIATION-POLYMERIZABLE COMPOSITIONS

(75) Inventor: Patrick D. Hyde, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 912 days.

(21) Appl. No.: 11/420,288

(22) Filed: May 25, 2006

(65) Prior Publication Data

US 2007/0276108 A1   Nov. 29, 2007

(51) Int. Cl.
*C08F 20/06* (2006.01)
*C08F 118/02* (2006.01)
*C08K 5/42* (2006.01)
*C08L 31/00* (2006.01)

(52) U.S. Cl. ............... 526/317.1; 526/318.41; 526/319; 524/78; 524/556

(58) Field of Classification Search ............... 526/317.1, 526/318.41, 319; 524/78, 173, 556
See application file for complete search history.

(56) References Cited

U.S. PATENT DOCUMENTS

| | | | |
|---|---|---|---|
| 3,725,115 A * | 4/1973 | Cristenson et al. ........... 442/151 |
| 4,181,752 A * | 1/1980 | Martens et al. ............... 427/516 |
| 4,329,384 A | 5/1982 | Vesley et al. | |
| 4,330,590 A | 5/1982 | Vesley | |
| 4,379,201 A | 4/1983 | Heilmann et al. | |
| 4,391,681 A | 7/1983 | Anderson et al. | |
| 4,737,559 A | 4/1988 | Kellen et al. | |
| 5,202,361 A | 4/1993 | Zimmerman et al. | |
| 5,741,543 A * | 4/1998 | Winslow et al. ........... 427/208.4 |
| 5,804,610 A | 9/1998 | Hamer et al. | |
| 5,902,836 A | 5/1999 | Bennett et al. | |
| 6,461,728 B2 * | 10/2002 | Weiss et al. ................... 428/345 |
| 6,632,522 B1 | 10/2003 | Hyde et al. | |
| 6,646,033 B2 * | 11/2003 | Wool et al. ..................... 524/157 |
| 7,081,545 B2 | 7/2006 | Klun et al. | |
| 2005/0154079 A1 | 7/2005 | Walker et al. | |
| 2005/0250923 A1 | 11/2005 | Palmese et al. | |

FOREIGN PATENT DOCUMENTS

JP    2001-188204    7/2001

OTHER PUBLICATIONS

Bunker et al., "Synthesis and Characterization of Monomers and Polymers for Adhesives from Methyl Oleate", Journal of Polymer Science: Part A: Polymer Chemistry, (2002), pp. 451-458, vol. 40, John Wiley & Sons, Inc.
Khot et al., "Development and Application of Triglyceride-Based Polymers and Composites", Journal of Applied Polymer Science, (2001), pp. 703-723, vol. 82, John Wiley & Sons, Inc.
Satas, "Handbook of Pressure Sensitive Adhesive Technology", (1989), p. 172, $2^{nd}$ Edition, Van Nostrand Reinhold, New York.
Koley, "Comparative Study of the Polymerization of Oleic Acid With Its Methyl Ester in an Azeotropic Saltbath", Farben-Chemiker, (1971), pp. 9-12, vol. 73, No. 6, Department of Applied Chemistry, Calcutta University, Calcutta-9.
Ney, "Changes in the Methyl Esters of Fatty Acids Under Oxidative Conditions at High Temperatures", Fette, Seifen, Anstrichmittel, (1965). pp. 190-194, vol. 67, No. 3.
La Scala et al., "The Effect of Fatty Acid Composition on the Acrylation Kinetics of Epoxidized Triacylglycerols", JAOCS, (2002), pp. 59-63, vol. 79, No. 1, AOCS Press.

* cited by examiner

*Primary Examiner* — Michael M Bernshteyn
(74) *Attorney, Agent, or Firm* — Robert H. Jordan

(57) ABSTRACT

An ultraviolet radiation-polymerizable composition comprises (a) an acrylated monounsaturated fatty acid alkyl ester, (b) a monoethylenically unsaturated (meth)acrylic acid ester of a non-tertiary alkyl alcohol, and (c) a photoinitiator.

27 Claims, No Drawings

ULTRAVIOLET RADIATION-POLYMERIZABLE COMPOSITIONS

FIELD

This invention relates to ultraviolet (UV) radiation-polymerizable compositions, and to pressure sensitive adhesives (PSAs) made from the UV radiation-polymerizable compositions.

BACKGROUND

PSAs are well known to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength.

Petroleum-based materials such as, for example, synthetic rubbers (for example, styrene/butadiene copolymers (SBR) and styrene/isoprene/styrene (SIS) block copolymers), and various (meth)acrylate (for example, acrylate and methacrylate) copolymers are commonly used for the preparation of PSAs. PSAs made by UV radiation polymerizing an alkyl acrylate (for example, iso-octyl acrylate), a monoethylenically unsaturated copolymerizable monomer (for example, acrylic acid, N-vinyl pyrrolidone, etc.), and poly-($\alpha$-olefins) (for example, poly(1-hexene), poly(1-hexene-co-propylene-co-ethylene, etc.) are known in the art, for example, to exhibit good high and low temperature performance and excellent adhesion to low and high energy substrates (see, for example, U.S. Pat. No. 5,202,361 (Zimmerman et al.)).

Replacing some of the petroleum-based raw materials in PSAs with renewable resources can be attractive both economically and environmentally. Renewable plant-based raw materials are relatively inexpensive, and their use can contribute to global sustainability by not depleting scarce resources. In addition, many naturally occurring materials such as plant oils are biodegradable in natural media.

SUMMARY

In view of the foregoing, we recognize that there is a need in the art for PSAs made from UV radiation-polymerizable compositions comprising renewable raw materials. Furthermore, we recognize that such PSAs must still exhibit useful cohesive shear strength, tack, and peel adhesion.

Briefly, the present invention provides a UV radiation-polymerizable composition comprising (a) an acrylated monounsaturated fatty acid alkyl ester, (b) a monoethylenically unsaturated (meth)acrylic acid ester of a non-tertiary alkyl alcohol in which the alkyl group has from about 1 to about 20 carbon atoms, and (c) a photoinitiator. The acrylated monounsaturated fatty acid alkyl ester can be represented by the following general formula:

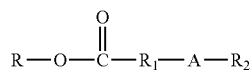

wherein
R is an alkyl group,
$R_1$ is an alkylene group,
$R_2$ is an alkyl group or H,
A is represented by one of the following general formulae:

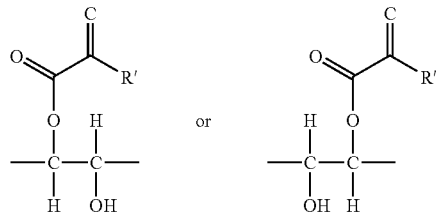

wherein R' is H or $CH_3$,
and —$R_1$-A-$R_2$ has from about 14 to about 22 carbon atoms in the catenary chain (that is, excluding carbon atoms in pendant portions).

The UV radiation-polymerizable composition of the invention can be used to prepare PSAs. Therefore, in another aspect, the present invention provides PSAs prepared by exposing the composition of the invention to ultraviolet radiation.

The acrylated monounsaturated fatty acid alkyl ester of the UV radiation-polymerizable composition of the invention can be derived from plant oils. Thus, the present invention meets the need in the art for PSAs made from UV radiation-polymerizable compositions comprising renewable raw materials.

Furthermore, PSAs made from UV radiation-polymerizable compositions of the invention exhibit useful cohesive shear strength, tack, and peel adhesion, and meet the Dahlquist criteria as described in the Handbook of Pressure-sensitive Adhesive Technology, edited by D. Satas, pg. 172 (1989) at use temperatures.

In yet another aspect, the present invention provides a method for making a pressure sensitive adhesive composition. The method comprises (a) combining (i) the ultraviolet radiation-polymerizable composition and (ii) a packaging material to form a packaged ultraviolet radiation-polymerizable composition, and (b) exposing the ultraviolet radiation-polymerizable composition to ultraviolet radiation to polymerize the ultraviolet radiation-polymerizable composition to form a packaged pressure sensitive adhesive composition. The packaging material is preferably meltable and mixable with the pressure sensitive adhesive composition so as to provide a coatable pressure sensitive adhesive composition when the packaged pressure sensitive adhesive composition is melted.

As used herein, "(meth)acrylic" refers to acrylate, methacrylate, acrylamide, and methacrylamide compounds, as well as alkyl and aryl compounds that have been substituted with an acrylate or methacrylate group.

As used herein, an "acrylated" monounsaturated fatty acid alkyl ester refers to a monounsaturated fatty acid alkyl ester wherein a (meth)acrylate group is present at its previous site(s) of unsaturation.

DETAILED DESCRIPTION

Acrylated Monounsaturated Fatty Acid Alkyl Ester

The UV polymerizable composition of the invention comprises an acrylated monounsaturated fatty acid alkyl ester represented by the following general formula:

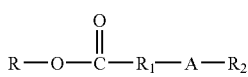

wherein
R is an alkyl group,
$R_1$ is an alkylene group,
$R_2$ is an alkyl group or H,
A is represented by one of the following general formulae:

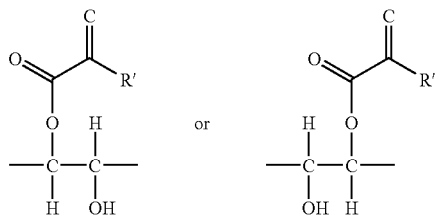

wherein R' is H or $CH_3$,
and $-R_1-A-R_2$ has from about 14 to about 22 carbon atoms in the catenary chain.

Preferably, $-R_1-A-R_2$ has from about 16 to about 18 carbon atoms in the catenary chain.

Preferably, R is an alkyl group having from about 1 to about 12 carbon atoms; more preferably, R is a methyl group.

Preferably, R' is H.

Useful acrylated monounsaturated fatty acid alkyl esters include, for example, acrylated alkyl myristoleate, acrylated alkyl palmitoleate, acrylated alkyl margoleate, acrylated alkyl oleate, acrylated alkyl gadoleate, and acrylated alkyl eruceate. Preferably, the acrylated monounsaturated fatty acid alkyl ester is an acrylated monounsaturated fatty acid methyl ester such as, for example, acrylated methyl margaroleate, acrylated methyl palmitoleate, or acrylated methyl oleate. Preferably, the acrylated monounsaturated fatty acid alkyl ester is acrylated methyl palmitoleate or acrylated methyl oleate; more preferably, it is acrylated methyl oleate.

Acrylated monounsaturated fatty acid alkyl esters can be derived, for example, from plant oils (see, for example, U.S. Pat. No. 6,646,033 and Bunker et al., Journal of Polymer Science Part A: Polymer Chemistry, 40, 451-458 (2002)). Plant oils are triglyceride esters of fatty acids. Triglyceride esters of fatty acids can be functionalized (for example, acrylated) at a number of reactive sites (for example, at the double bond, the allylic carbons, the ester group and the carbon alpha to the ester group) to render them polymerizable.

There are several methods for introducing ethylenically unsaturated functionalities onto the fatty acid ester. One method involves the reaction of an ethylenically unsaturated carboxylic acid with an epoxidized form of the fatty acid, while another method involves the reaction of methacryloyl chloride with a hydroxylated form of the fatty acid ester.

Acrylated methyl oleate can be synthesized, for example, by first chemically reducing triglyceride molecules into oleic acid methyl ester through a well-known methanolysis reaction. An ethylenically substituted carboxylic acid, such as acrylic acid, can then be placed onto the unsaturation of the oleic acid methyl ester. This requires two steps.

First, the unsaturated bond in the methyl oleate is epoxidized by a peroxy acid. Useful peroxy acid epoxidizing agents include, for example, m-chloroperbenzoic acid, performic acid, perbenzoic acid, and peracetic acid. Chemo-enzymatic epoxidation can be used in the presence of hydrogen peroxide using immobilized lipase from *Candida antarctica* (Novozyme-435).

Next, the epoxidized oleic acid methyl ester is reacted with acrylic acid to produce the acrylated methyl oleate. Useful acrylation catalysts include, for example, quaternary ammonium salts, triphenylphosphine, chromium(III) organometallics such as chromium(III) diisopropylsalicylate, aromatic N-heterocycles, tertiary aliphatic amines, and aromatic amines. The acrylate renders the molecule polymerizable.

Natural plant oils contain a distribution of fatty acids. Examples of fatty acids that are useful in the present invention include myristoleic (14:1), palmitoleic (16:1), margaroleic (17:1), oleic (18:1), gadoleic (20:1), and erucic (22:1) (wherein the first number in parenthesis indicates the number of carbons and the second number in parenthesis indicates the number of double bonds; for example, (14:1) indicates 14 carbon atoms containing one C=C double bond). Suitable plant oils from which acrylated monounsaturated fatty acid alkyl esters useful in the invention can be derived include, for example, canola oil, olive oil, palm oil, and high oleic acid content soybean oil (for example, genetically engineered soybean oil available from DuPont).

Typically, the UV radiation-polymerizable composition of the invention comprises from about 1 to about 99 weight percent (preferably, about 1 to about 50 weight percent) of acrylated monounsaturated fatty acid alkyl ester.

Monoethylenically Unsaturated (Meth)acrylic Acid Ester

The UV radiation-polymerizable composition of the invention also comprises a monoethylenically unsaturated (meth)acrylic acid ester of a non-tertiary alkyl alcohol in which the alkyl group has from about 1 to about 20 carbon atoms (preferably, from about 3 to about 18 carbon atoms; more preferably, from about 4 to about 12 carbon atoms). Suitable monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates such as benzyl acrylate and cyclobenyzl acrylate. Preferred monomers include, for example, iso-octyl acrylate, n-butyl acrylate, hexyl acrylate, 2-ethylhexyl acrylate, isononyl acrylate, decyl acrylate, and dodecyl acrylate. A most preferred monomer is iso-octyl acrylate.

Typically, the UV radiation-polymerizable composition of the invention comprises from about 1 to about 99 weight percent (preferably, about 50 to about 99 weight percent) of monoethylenically unsaturated (meth)acrylic acid ester.

Photoinitiator

The UV radiation-polymerizable composition of the invention also comprises a photoinitiator. Useful photoinitiators include the benzoin ethers such as benzoin methyl ether and benzoin isopropyl ether; substituted acetophenones such as 2,2-diethoxyacetophenone (available as Irgacure™ 651 photoinitiator from Ciba-Geigy Corp.), 2,2-dimethoxy-2-phenyl-1-phenylethanone (available as Esacure™ KB-1 photoinitiator from Sartomer Co.), and dimethoxyhydroxyacetophenone; bisacyl phosphine (available as Irgacure™ 819 photoinitiator from Ciba-Geigy Corp.); substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxycarbonyl)oxime. Preferred among these are the substituted acetophenones.

The acrylated monounsaturated fatty acid alkyl esters of the invention can be highly absorbent (for example, less than 10% transmission for a 4 millimeter path length) at UV wavelengths typically used for initiating polymerization (for example, at 350 nm). This can lead to poor conversion of the acrylated monomer to polymer. The addition of monoethylenically unsaturated (meth)acrylic acid ester of a non-tertiary alkyl alcohol such as iso-octyl alcohol can increase the percent transmission and lead to higher conversions. Higher levels of monomer conversion to polymer can also be achieved by using a combination of a photoinitiator having an increased absorbency (for example, Irgacure™ 819) and UV lamps having increased spectral output in the 380-450 nm wavelength range (for example, Sylvania Super Blue F40T12 lamps).

Photoinitiator is present in the UV radiation-polymerizable composition of the invention in a photochemically effective amount (that is, in the amount needed to initiate free radical polymerization of the composition). Typically, photoinitiator is present in an amount from about 0.01 to about 5 parts by weight (pbw) per 100 pbw of the composition.

Optional Components

The UV radiation-polymerizable composition of the invention can include optional components including, but not limited to, acrylated fatty acid alkyl esters other than those described above, chain transfer agents, crosslinking agents, acrylic acid, and tackifying resins.

As discussed above, plant oils comprise a distribution of fatty acids. Many common plant oil, for example, comprise relatively large percentages of linoleic acid (18:2) and linolenic acid (18:3) in addition to desirable oleic acid (18:1). It can be difficult to separate linoleic and linolenic acid from oleic acid. Therefore, it can be difficult to obtain pure acrylated methyl oleate. Thus, the UV radiation-polymerizable composition of the invention often comprises acrylated fatty acid alkyl esters other than those described above (for example, acrylated methyl linoleate and acrylated methyl linolenate). Typically, the UV radiation-polymerizable composition of the invention comprises less than about 25 weight percent (preferably, less than about 15 weight percent; more preferably, less than about 5 weight percent) of these other acrylated fatty acid alkyl esters.

Chain transfer agents can be included in the UV radiation-polymerizable composition of the invention to control the molecular weight of the resulting polymer. Chain transfer agents are materials which regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether; and solvents such as ethanol, isopropanol, and ethyl acetate. Preferred chain transfer agents include, for example, IOTG and carbon tetrabromide.

The amount of chain transfer agent that is useful depends upon the desired molecular weight and the type of chain transfer agent. Solvents are useful as chain transfer agents, but they generally are not as active as, for example, the sulfur compounds. The chain transfer agent is typically used in amounts from about 0.001 pbw to about 1 pbw per 100 parts of total monomer, and preferably from about 0.01 pbw to about 0.5 pbw, and most preferably from about 0.02 pbw to about 0.20 pbw.

The UV radiation-polymerizable composition of the invention may also comprise an effective amount of a crosslinking agent, for example, to improve shear strength. The crosslinking agent may be activated after the resulting adhesive has been hot melt coated. Typically, the amount ranges from about 0.001 pbw to about 1 pbw per 100 parts of total monomer. The crosslinking agent can remain intact as a separate species in the adhesive, or it can be co-polymerized with the monomers. Crosslinking is preferably initiated after hot melt coating, and the crosslinking is preferably initiated by UV radiation, or ionizing radiation such as gamma radiation or electron beam (the use of separate crosslinking agents being optional in the case of ionizing radiation).

Crosslinking agents that can be added to the UV radiation-polymerizable composition include polyfunctional acrylate crosslinkers such as acrylic acid esters of polyhydric alcohols (for example, 1,6-hexanediol diacrylate and those described in U.S. Pat. No. 4,379,201, such as trimethylolpropane triacrylate, pentaerythritol tetracrylate, 1,2-ethyleneglycol diacrylate, 1,2-dodecanediol diacrylate, and the like). Typically, polyfunctional acrylate crosslinkers are present in the composition of the invention in an amount from about 0.001 pbw to about 1 pbw per 100 parts of total monomer.

Preferred crosslinking agents include, for example, multifunctional acrylates such as 1,6-hexanediol diacrylate and trimethylolpropane triacrylate, and substituted triazines such as 2,4-bis(trichloromethyl)-6-(4-methoxyphenyl)-s-triazine and 2,4-bis(trichloromethyl)-6-(3,4-dimethoxyphenyl)-s-triazine, as described in U.S. Pat. Nos. 4,329,384 and 4,330,590. Another class of preferred crosslinking agents is the copolymerizable mono-ethylenically unsaturated aromatic ketone comonomers free of ortho-aromatic hydroxyl groups such as those disclosed in U.S. Pat. No. 4,737,559. Specific examples include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like.

Most preferred crosslinking agents include, for example, 1,6-hexanediol diacrylate, trimethylolpropane triacrylate, and 2,4-bis(trichloromethyl)-6-(4-methoxyphenyl)-s-triazine.

Yet another suitable crosslinking agent is 1,5-bis(4-benzoylbenzoxy)pentane. Also suitable are hydrogen-abstracting carbonyls such as anthraquinone, benzophenone, and derivatives thereof, as disclosed in U.S. Pat. No. 4,181,752.

Optionally, the photoinitiator in the UV radiation-polymerizable composition can also function as a photocrosslinker. Materials which function as both photoinitiators and photocrosslinkers include the chromophore substituted bistrichloromethyl triazines such as those described in U.S. Pat. Nos. 4,391,681, 4,330,590, and 4,329,384 (for example, 2,4-bis(trichloromethyl)-6-(4-methoxyphenyl)-s-triazine; 2,4-bis(trichloromethyl)-6-(3,4-dimethoxyphenyl)-s-triazine; 2,4-bis(trichloromethyl)-6-(3,5-dimethoxyphenyl)-s-triazine and the like; 2,4-bis(trichloromethyl)-6-(1-naphthyl)-s-triazine; 2,4-bis(trichloromethyl)-6-(2-naphthyl)-s-triazine; and 2,4-bis(trichloromethyl)-6-(1-(4-methoxynaphthyl))-s-triazine). These compounds and the like are useful as photoactive agents when present in an amount from about 0.01 to about 5 pbw per 100 pbw of the radiation curable composition. They can be used alone or with a photoinitiator (described above). The usefulness of these compounds is in their ability to impart high temperature shear to the inventive compositions.

Acrylic acid can also be optionally added to the UV radiation-polymerizable composition of the invention, for example, as a hardener. If acrylic acid is added, it is typically added in amounts from about 0.5 to about 20 weight percent (preferably, about 2 to about 10 weight percent) of the UV radiation-polymerizable composition.

The composition of the invention can further include tackifying resins to increase the tack of the resulting adhesive. The tackifying resins can also be added during the hot melt coating step. Suitable tackifying resins include rosin esters, terpenes, phenols, and aliphatic, aromatic, or mixtures of aliphatic and aromatic synthetic hydrocarbon pure monomer resins. Examples of useful tackifying resins that are commercially available include Foral™ 85 and hydrocarbon resins sold under the Regalrez™ tradename by Hercules, Inc., ECR-180 available from Exxon Chemicals, and SP553 terpene phenolic resin available from Schenectady International, Inc. If used, the amount of tackifying resin can range from about 1 to about 50 weight percent (preferably, from about 5 to about 30 weight percent) of the UV radiation-polymerizable composition.

Other additives can be included in the UV radiation-polymerizable composition of the invention, or added at the time of hot melt coating to change the properties of the resulting adhesive. Such additives, or fillers, include plasticizers, pigments, glass or polymeric bubbles or beads (which may be expanded or unexpanded), fibers, reinforcing agents, hydrophobic or hydrophilic silica, calcium carbonate, toughening agents, fire retardants, antioxidants, finely ground polymeric particles such as polyester, nylon, and polypropylene, and stabilizers. The additives are added in amounts sufficient to obtain the desired end properties.

Preparation

The UV radiation-polymerizable composition of the invention can be prepared by mixing acrylated monounsaturated fatty acid alkyl ester, monoethylenically unsaturated (meth)acrylic acid ester of a non-tertiary alkyl alcohol, photoinitiator, and optional components.

The UV radiation-polymerizable composition can then be combined with a packaging material to form a packaged UV radiation-polymerizable composition. The packaged UV radiation-polymerizable composition can be exposed to UV radiation to polymerize the composition and form a packaged PSA composition.

The UV radiation-polymerizable composition can be combined with packaging material by substantially or completely surrounding the composition with the packaging material. The UV radiation-polymerizable composition can also be combined with packaging material by disposing it on the surface of a sheet, or between a pair of sheets. In the latter case, at least one of the sheets is selected such that it does not substantially adversely affect the adhesive properties of the PSA composition when the composition and the sheet are melted and mixed together. Alternatively, the packaging material can be in the form of a hollow profile in which the ratio of the length to the square root of the cross-sectional area of the profile is at least about 30:1.

The packaging material can either be retained following polymerization (and thus becomes part of the final product, or it can be removed following polymerization and prior to subsequent processing.

When the packaging material is to be retained following polymerization, the packaging material is selected such that it does not substantially adversely affect the desired adhesive properties of the PSA composition when the PSA adhesive composition and the packaging material are melted and mixed together. The desired adhesive properties are determined by the requirements of the end user. Desired PSA properties can include peel strength and shear strength.

The UV radiation-polymerizable composition can be completely surrounded by the packaging material. Preferably, from about 0.1 to about 500 g of UV radiation-polymerizable composition is completely surrounded by the packaging material. In another embodiment, from about 3 to about 100 g of UV radiation-polymerizable composition is completely surrounded by the packaging material. In another embodiment, the UV radiation-polymerizable composition is substantially surrounded by the packaging material. In yet another embodiment, the UV radiation-polymerizable composition is disposed on the surface of a sheet, or between a pair of two substantially parallel sheets of packaging material. In another embodiment, the UV radiation-polymerizable composition is substantially or completely surrounded by a hollow profile of packaging material with a length:square root of the cross-sectional area ratio of at least 30:1.

A small amount of volatile, non-polymerizable solvent may be included in the UV radiation-polymerizable composition to dissolve other additives, such as a crosslinking agent. The UV radiation-polymerizable composition preferably contains less than 10 weight percent (preferably, less than 5 weight percent; more preferably, less than 1 weight percent) of solvent. In a preferred embodiment, the pre-adhesive composition is essentially free of solvent.

The packaging material is made of a material that when combined with the PSA does not substantially adversely affect the desired adhesive characteristics.

In one embodiment, the UV radiation-polymerizable composition is substantially surrounded with the packaging material; in another embodiment of the invention, the UV radiation-polymerizable composition is completely surrounded with the packaging material. In this embodiment, it is intended that the pre-adhesive composition be completely surrounded by the packaging material, but random variations in production may produce occasional packaged pre-adhesives in which the UV radiation-polymerizable composition is not completely surrounded with the packaging material. It yet other embodiments, the UV radiation-polymerizable composition is disposed on the surface of a sheet, or between a pair of sheets.

The packaging material preferably melts at or below the processing temperature of the PSA (that is, the temperature at which the PSA flows). The packaging material preferably has a melting point of 200° C. or less, preferably 170° C. or less. In a preferred embodiment the melting point ranges from 90° C. to 150° C. The packaging material may be a flexible thermoplastic polymeric film. The packaging material is preferably selected from ethylene-vinyl acetate, ethylene-acrylic acid, polypropylene, polyethylene, polybutadiene, or ionomeric films. In a preferred embodiment the packaging material is an ethylene-acrylic acid or ethylene-vinyl acetate film.

In practice, films ranging in thickness from about 0.01 mm to about 0.25 mm are typically used. The thicknesses preferably range from about 0.025 mm to about 0.127 mm to obtain films that have good strength during processing while being thin enough to heat seal quickly and minimize the amount of film material used.

The amount of packaging material depends upon the type of material and the desired end properties. The amount of packaging material typically ranges from about 0.5 percent to about 20 percent of the total weight of the UV radiation-polymerizable composition and the packaging material. Preferably, the packaging material is between 2 percent and 15 percent by weight, and more preferably between 3 percent and 5 percent. Such packaging materials may contain plasticizers, stabilizers, dyes, perfumes, fillers, slip agents, anti-block agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the PSA.

The film material should be sufficiently transparent to UV radiation at the wavelengths necessary to effect polymerization.

Polymerization can also be effected by exposure to UV radiation as described in U.S. Pat. No. 4,181,752 (Martens et al.). In a preferred embodiment, the polymerization is carried out with UV black lights having over 60 percent, and preferably over 75 percent of their emission spectra between 280 to 400 nanometers (nm), with an intensity between about 0.1 to about 25 mW/cm$^2$.

During photopolymerization it is desirable to control the temperature by blowing cooling air around the packaged UV radiation-polymerizable composition, by running the packaged UV radiation-polymerizable composition over a cooled platen, or by immersing the packaged U UV radiation-polymerizable composition in a water bath or a heat transfer fluid during polymerization. Preferably, the packaged UV radiation-polymerizable compositions are immersed in a water bath, with water temperatures between about 5° C. and 90° C., preferably below about 30° C. Agitation of the water or fluid helps to avoid hot spots during the reaction.

The polymerized PSAs may be used to make a coatable thermoplastic or thermosettable hot melt adhesive by introducing the PSA and its packaging material into a vessel in which the PSA and its packaging material are melted. This hot melt adhesive may be used to form a PSA sheet by coating the melted PSA and its packaging material onto a sheet material or another suitable substrate. The sheet material is preferably selected from a tape backing (for example, polyethylene terephthalate) or a release liner (for example, siliconized paper). Preferably, the polymerized PSAs are hot melt coated by putting the packaged PSA in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun. If a crosslinking agent is added, the coated PSA can then be exposed to sufficient UV radiation or ionizing radiation to effect the crosslinking. Crosslinking is preferably initiated after coating.

The steps may be done in-line (that is, the UV radiation-polymerizable composition may be surrounded by the packaging material, polymerized, hot melt coated to form a tape, and optionally crosslinked), or the steps may be performed individually at separate times and sites. For example, the packaged UV radiation-polymerizable composition may be polymerized at one time, and extruded and crosslinked at another time.

Two lengths of thermoplastic film can also be heat sealed together across the bottom and on each of the lateral edges on a liquid form-fill-seal machine to form an open ended pouch. The UV radiation-polymerizable composition is pumped through a hose to fill the pouch, and the pouch is then heat sealed across the top to completely surround the adhesive composition.

Preferably, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the pre-adhesive composition can alter the packaging material, and it is desirable to cross-seal the pouches within about one minute of filling, more preferably within 30 seconds, and most preferably within 15 seconds. If the UV radiation-polymerizable composition decreases the strength of the packaging material, it is preferable to polymerize the composition as soon as possible after the pre-adhesive composition is surrounded by the packaging material (for example, within 24 hours).

Alternatively, a single length of film can be folded lengthwise and sealed on one edge, filled with the UV radiation-polymerizable composition, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film. For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

The UV radiation-polymerizable composition can also be continually introduced into a hollow profile of a polymeric film material, continuously exposed to UV radiation capable of polymerizing the UV radiation-polymerizable composition, continuously polymerized to provide a thermoplastic or thermosettable hot melt adhesive, and the polymeric film material and its contents continuously introduced into a vessel in which the polymeric film material and its contents are melted. The polymeric film material does not substantially adversely affect the adhesive characteristics of a hot melt coated mixture of the adhesive and the polymeric film material. The hot melt adhesive and polymeric film material may be melted, mixed, and coated onto a sheet material to form a PSA-coated sheet. The hollow profile of the polymeric film material is the interior of a continuous tube of polymeric film material. The continuous tube is preferably a cylindrical, elliptical, or rectangular continuous tube. In a preferred embodiment the continuous tube is an elliptical continuous tube. In one embodiment of the invention, the tube does not have cross-seals. The hollow profile of the polymeric film material preferably has a cross-sectional area of from about 0.5 cm$^2$ to about 25 cm$^2$, more preferably from about 1 cm$^2$ to about 10 cm$^2$.

The UV radiation-polymerizable composition can also be coated onto a carrier web, covered with a sheet material, and polymerized with UV radiation, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not coatable with the adhesive (for example, as in the case when the packaging material is removed following polymerization and prior to subsequent processing as described below), it should be treated, if necessary, so that the adhesive can be removed easily from it. Such treatments include silicone release coatings, polyfluoropolyether coatings, and polyfluoroethylene coatings such as Teflon™.

The carrier web should provide sufficient strength to support the coated UV radiation-polymerizable composition during polymerization, or it can be supported by a platen during polymerization. The carrier web can be an endless conveyor belt, or it can be a flexible material which can be wound into a roll with the adhesive; the carrier web is itself a sheet material. Endless conveyor belts can be made from silicone elastomers; polymeric films such as those made from polyfluoroethylene, polyester, nylon, polycarbonate, and the like; metals such as stainless steel; rubber; glass fibers; and the like. Useful flexible materials include paper and polymeric films such as those made from polyester, nylon, polycarbonates, polyolefins, ethylene acrylic acid, ethylene vinyl acetate, ionomers, and the like. Coatable flexible materials include polyolefins such as polypropylene, polyethylene, and polybutadiene; ethylene acrylic acid; ethylene vinyl acetate; and ionomers.

Likewise, the sheet material can be made from the aforementioned flexible materials as well as non-flexible plates made of glass, polymers, or metals, which may optionally be coated with a release material. The carrier web, the sheet material, or both should be sufficiently transparent to UV radiation to effect polymerization.

The UV radiation-polymerizable composition can also be coated onto a carrier web and polymerized with UV radiation wherein the coated pre-adhesive is not covered with a sheet material. The carrier web is coatable with the adhesive. In a preferred embodiment, when the coated pre-adhesive is not covered with a sheet material, the polymerization is conducted in an inert atmosphere.

In some situations, the packaging material is removed after polymerization so that any further processing (for example, melting, coating, or simply application of the adhesive) involves only the adhesive. The packaging materials described above are suitable. However, because the packaging material is removed before any post-polymerization processing, the choice of packaging material is not limited to materials that will not substantially affect the adhesive properties of the final product when melted together. Thus, a wide variety of packaging material may be used, with materials permitting ready removal from the adhesive being preferred. To enhance the ability to remove the adhesive from the packaging material, the packaging material may be provided with a release material.

PSAs made from the UV radiation-polymerizable composition of the invention are useful, for example, in articles such as lint rollers, tapes (for example, electrical, medical, surface protective, and carton-sealing tapes), medical dressings, label stock, and articles for other structural bonding applications.

EXAMPLES

Objects and advantages of this invention are further illustrated by the following examples, but the particular materials and amounts thereof recited in these examples, as well as other conditions and details, should not be construed to unduly limit this invention.

Test Methods
Ultraviolet (UV) Lamp Intensity

The UV intensity of the lamps used to make the adhesives of the invention was measured using a Model UR365CH1 UV Integrating Radiometer (Electronic Instrumentation & Technology, Inc., Sterling, Va.). The output of the two Sylvania F20T12/350/BL/50 W lamps (Osram Sylvania Inc., Danvers, Mass.) was measured to be 5.9 milliwatts (mW)/centimeter$^2$ (cm$^2$). The output of the two Sylvania Super Blue F40T12/SDB/65 W (Osram Sylvania Inc., Danvers, Mass.) lamps was measured to be 0.33 mW/cm$^2$.

180° Peel Force

The performance of the tapes made using the adhesives of the invention was evaluated using an adhesion to steel test per ASTM D 3330. A 180 degree peel angle was used with a testing speed of 30.5 cm/min. Test specimens were 2.54 cm in width and were adhered to stainless steel panels using 2 passes of a 2.0 kg steel roller. The amount of adhesive that transferred from the test specimen to the steel panel was measured by qualitatively evaluating the amount of adhesive left on the panel and the tape specimen.

Shear Hang Time

The performance of the tapes made using the adhesives of the invention was evaluated using a static shear test. A 2.54×2.54 cm portion of a 2.54 cm wide by 7.62 cm long tape specimen was adhered to a polished stainless steel test panel surface using 2 passes of a 2.0 kg steel roller. The non-adhered portion of the specimen was reinforced using 3M Scotch 893 Industrial Strapping Tape (3M Co., St. Paul, Minn.) and staples. A 1 kg weight was hung from the reinforced end of the specimen and the time to failure in minutes was recorded. All failures were cohesive splits of the pressure sensitive adhesive coating unless otherwise noted. The amount of adhesive that transferred from the test specimen to the steel surface was measured by qualitatively evaluating the amount of adhesive left on the surface and the tape specimen. An observation of "0% coh" refers to an adhesive peel failure or "pop-off" failure in shear. Each shear hang time value is reported as the average of two measurements. A '+' value indicates that the specimen was still hanging at the time the test was stopped.

Polymer Gel Fraction

The UV polymerized pressure sensitive adhesives of the invention were evaluated for insoluble gel content. 0.1 to 0.3 grams of the polymer were added to 18 grams of ethyl acetate and shaken for 24 hours. The shaken solution was filtered using a 64 mesh 3.8×3.8 cm basket. The basket was dried at 121° C. for 30 minutes. The gel fraction was measured by calculating the weight of dried polymer remaining divided by the initial weight of the polymer.

Monomer Viscosity

The acrylated methyl esters of the invention were evaluated for their viscosity at 21° C. using a Brookfield Digital Viscometer Model DV-LE (Brookfield Engineering Laboratories, Inc., Middleboro, Mass.). The viscometer was fitted with a #64 spindle and was operated at 30 rpm. The viscosity value is reported as millipascals (mPas) which is equivalent to centipoises (cps).

Example 1

A pressure sensitive adhesive formulation and tape were made using the following procedure. 200 grams of methyl oleate (99% purity, Aldrich Inc., Milwaukee, Wis.) were combined with 160 grams of 30% H$_2$O$_2$ (Mallinckrodt Baker Inc., Phillipsburg, N.J.) and 104 grams of formic acid (88%, EM Science, Gibbstown, N.J.) in a 1000 mL Erlenmeyer flask. The components were vigorously stirred using a glass stirring rod fitted with a Teflon™ blade for 16 hours. 200 mL of ethyl acetate was added to the reaction mixture. The organic phase was collected using a separatory funnel and then washed with 300 grams of de-ionized water, 300 grams of saturated sodium bicarbonate (to neutralize any remaining acids) and 300 grams of saturated sodium chloride solution. The remaining organic phase was dried over sodium sulfate, filtered and the ethyl acetate was aspirated off to leave 187 grams of the epoxidized methyl oleate. 187 grams of the epoxidized methyl oleate were combined with 65.5 grams of acrylic acid (99%, Mallinckrodt Baker Inc., Phillipsburg, N.J.), 0.56 grams hydroquinone inhibitor (99%, Aldrich Chemical Company, Milwaukee, Wis.) and 1.9 grams of an accelerating catalyst [(chromium(III) organometallic] designed for an epoxy-acid reaction (AMC-2, Aerojet Fine Chemicals Inc., Rancho Cordova, Calif.) in a 500 mL Erlenmeyer flask. The components were vigorously stirred using a glass stirring rod fitted with a Teflon™ blade in an oil bath maintained at 90±3° C. for 6 hours. 200 mL of ethyl acetate was added to the reaction mixture and the organic phase was collected using a separatory funnel. The organic phase was then washed with 300 grams of de-ionized water, 300 grams of saturated sodium bicarbonate (to neutralize any remaining acids) and 300 grams of saturated sodium chloride solution. The remaining organic phase was dried over sodium sulfate, filtered and the ethyl acetate then aspirated off to leave 187 grams of the acrylated methyl oleate (AMO). The AMO had a greenish amber color due to the presence of residual chromium (III) catalyst and had a transmittance (% T) of 0.05 (4 mm path length) at 350 nm, 0.9% T at 420 nm and 4.3% T at 450 nm.

47.5% of the AMO was combined with 47.5% isooctylacrylate (IOA), 5% acrylic acid (AA) and 0.2 parts per hundred monomer (pphm) of IRGACURE 651 photoinitiator (Ciba Specialty Chemicals, Basel, Switzerland). The mixture was shaken for 5 minutes and approximately 10 grams were pipetted into a 5.1 cm (2 inches) wide by 7.6 cm (3 inches) long ZIP LOCK polyethylene pouch (air bubbles were minimized). The sealed pouch was placed in room temperature deionized water with a screen to hold the pouch under the water surface. The pouch was then exposed to predominantly 350 nm ultraviolet radiation from two Sylvania F20T12/350/BL/50 W (Osram Sylvania Inc., Danvers, Mass.) lamps for 10 minutes per each pouch side (total irradiation time was 20 minutes). The resulting polymer was separated from the pouch material by exposure to liquid nitrogen.

A polymer solution was prepared by dissolving the resulting polymer in ethyl acetate at either 20% or 33% solids. A pressure sensitive adhesive tape was prepared by coating the polymer solution onto a 25 micron thick polyethylene terephthalate (PET) film using a knife coating apparatus. The samples were dried for 15 minutes at 70° C. (158° F.). The coating weight of the adhesive was 29 grams/meter$^2$ (6.9 grains/inch$^2$).

Example 2

A pressure sensitive adhesive formulation and tape were made using the materials and procedure in Example 1 above except the composition prior to polymerization was 67.5% AMO, 22.5% IOA, 10% AA and 0.2 parts per hundred monomer (pphm) of IRGACURE 651. The coating weight of the adhesive was 36 grams/meter$^2$ (8.5 grains/inch$^2$ Comparative Example C1

An adhesive formulation was prepared using the materials and procedure in Example 1 above except an epoxidized soybean oil-based triester acrylate (ESOA, CN-111, Sartomer Co. Inc., Exton, Pa.) was used in place of the AMO. The composition prior to polymerization was 12% ESOA, 88% IOA, and 0.2 parts per hundred monomer (pphm) of IRGACURE 651. The composition was polymerized for 6 minutes per each pouch side for a total irradiation time of 12 minutes. The resulting material was stiff with very little tack. It had poor cohesive strength and crumbled upon stretching.

Comparative Example C2

An adhesive formulation was prepared using the materials and procedure in Comparative Example C1 above except the composition prior to polymerization was 5% ESOA, 95% IOA, and 0.2 parts per hundred monomer (pphm) IRGACURE 651. The composition was polymerized at full power for 6 minutes per each pouch side (total irradiation time was 12 minutes). The resulting material was stiff with very little tack. It had poor cohesive strength and crumbled upon stretching.

Comparative Example C3

An adhesive formulation and tape were prepared using the materials and procedure in Example 1 above except the AMO was deleted from the formulation. The composition prior to polymerization was 90% IOA, 10% AA and 0.2 parts per hundred monomer (pphm) IRGACURE 651. The coating weight of the adhesive was 21 grams/meter$_2$ (5.0 grains/inch$^2$ Comparative Example C4

An adhesive formulation was prepared using the materials and procedure in Example 1 above except the IOA was deleted from the formulation. The composition prior to polymerization was 90% AMO, 10% AA and 0.2 parts per hundred monomer (pphm) of IRGACURE 651. The formulation did not adequately polymerize during the 20 minute UV exposure time because of the high absorbency of the composition at the UV polymerizing wavelengths.

Example 3

A pressure sensitive adhesive formulation and tape were made using the materials and procedure in Example 1 above except IRGACURE 819 (Ciba Specialty Chemicals, Basel, Switzerland) was used as the photoinitiator. The composition prior to polymerization was 47.5% AMO, 47.5% IOA, 5% AA and 0.5 parts per hundred monomer (pphm) of IRGACURE 819. The pouch were exposed to predominantly 350 nm ultraviolet radiation from two Sylvania Super Blue F40T12/SDB/65 W (Osram Sylvania Inc., Danvers, Mass.) lamps for 10 minutes per each pouch side (total irradiation time was 20 minutes). The coating weight of the adhesive was 29 grams/meter$^2$ (6.9 grains/inch$^2$).

Example 4

A pressure sensitive adhesive formulation and tape were made using the materials and procedure in Example 3 above except the composition prior to polymerization was 46.5% AMO, 46.5% IOA, 7% AA and 0.5 parts per hundred monomer (pphm) of IRGACURE 819. The coating weight of the adhesive was 37 grams/meter$_2$ (8.8 grains/inch$^2$ Example 5

A pressure sensitive adhesive formulation and tape were made using the materials and procedure in Example 3 above except the composition prior to polymerization was 60% AMO, 30% IOA, 10% AA and 0.5 parts per hundred monomer (pphm) of IRGACURE 819. The coating weight of the adhesive was 37 grams/meter$^2$ (8.9 grains/inch$^2$).

Example 6

A pressure sensitive adhesive formulation and tape were made using the materials and procedure in Example 3 above except the composition prior to polymerization was 70% AMO, 20% IOA, 10% AA and 0.5 parts per hundred monomer (pphm) of IRGACURE 819. The coating weight of the adhesive was 32 grams/meter$^2$ (7.6 grains/inch$^2$).

Example 7

A pressure sensitive adhesive formulation and tape were made using the materials and procedure in Example 3 above except the composition prior to polymerization was 80% AMO, 10% IOA, 10% AA and 0.5 parts per hundred monomer (pphm) of IRGACURE 819. The coating weight of the adhesive was 28 grams/meter$^2$ (6.6 grains/inch$^2$).

Comparative Example C5

An adhesive formulation and tape were prepared using the materials and procedure in Example 3 above except the AMO was deleted from the formulation. The composition prior to polymerization was 95% IOA, 5% AA and 0.2 parts per hundred monomer (pphm) of IRGACURE 651. The coating weight of the adhesive was 34 grams/meter$^2$ (8.2 grains/inch$^2$).

Comparative Example C6

An adhesive formulation and tape were prepared using the materials and procedure in Example 3 above except the IOA was deleted from the formulation. The composition prior to polymerization was 90% AMO, 10% AA and 0.5 parts per hundred monomer (pphm) of IRGACURE 819. The coating weight of the adhesive was 21 grams/meter$^2$ (5.0 grains/inch$^2$).

Example 8

Methyl oleate (99+%, Sigma Chemical Co., St. Louis, Mo.) was epoxidized as in Example 1 and acrylated using the AMC-2 chromium (III) catalyst. The viscosity of the AMO was measured to be 140 mPas. The AMO had a greenish yellow color due to the presence of residual chromium (III) catalyst and had a transmittance (% T) of 7.8 (4 mm path length) at 350 nm, 45.6% T at 420 nm and 58.3% T at 450 nm. The gel fraction was measured to be 0.61. A pressure sensitive adhesive formulation and tape were made by mixing AMO, IOA and IRGACURE 651 at 50%, 50% and 0.2 parts per hundred monomer (pphm), respectively. The composition was placed between a 38 micron (0.0015 inches) thickness polyethylene terephthalate (PET) film and a 51 micron thickness (0.002 inches) thick siliconized PET film and drawn through a knife coater with a gap setting of 178 microns (0.007 inches). The composition was exposed to the output from two Sylvania F20T12/350/BL/50 W lamps for 6 minutes. The composition had a 102 micron (0.004 inches) coating thickness.

Example 9

Methyl oleate (99+%, Sigma Chemical Co., St. Louis, Mo.) was epoxidized as in Example 1 but acrylated using a different catalyst (imidazole). 50 grams of epoxidized 99.0% methyl oleate was reacted with 17 grams of acrylic acid, 0.5 grams of imidazole (99%, Aldrich Chemical Company, Milwaukee, Wis.) and 0.15 grams hydroquinone at 500 rpm for 6 hours at 90° C. The viscosity of the AMO was measured to be 140 mPas. The AMO had a light yellow amber color and had a transmittance (% T) of 0.1 (4 mm path length) at 350 nm, 1.4% T at 420 nm and 4.2% T at 450 nm. A pressure sensitive adhesive formulation and tape were made by mixing the AMO, IOA and IRGACURE 651 at 50%, 50% and 0.2 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches. The composition was exposed to the output from two Sylvania F20T12/350/BL/50 W lamps for 6 minutes. The composition had a 65 micron (0.0025 inches) coating thickness. The gel fraction was measured to be 0.64.

Example 10

A pressure sensitive adhesive formulation and tape were made as in Example 8 by mixing the chromium(III) catalyzed AMO, IOA, AA and IRGACURE 651 at 10%, 88%, 2% and 0.2 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had a 70 micron (0.0028 inches) coating thickness.

Example 11

A pressure sensitive adhesive formulation and tape were made as in Example 8 by mixing the chromium(III) catalyzed AMO, IOA, AA and IRGACURE 651 at 88%, 10%, 2% and 0.2 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania Super Blue F40T12/SDB/65 W (Osram Sylvania Inc., Danvers, Mass.) lamps for 6 minutes. The composition had a 170 micron (0.0067 inches) coating thickness.

Example 12

A different methyl ester having a mixture of saturated and unsaturated components (CE-1897, Proctor and Gamble Chemicals, Cincinnati Ohio) was epoxidized as in Example 1. This methyl ester contained 1.1% methyl palmitate (C16:0), 9.0% methyl stearate (C18:0), 77.6% methyl oleate (C18:1), 12.4% methyl linoleate (C18:2) and 0.1% methyl linolenate (C18:3). The saturated components were partially removed from the epoxidized CE-1897 by cold precipitation at −15° C. of a 2 to 1 mixture of methanol to epoxy. Additionally, a precipitate (9,10-dihydroxystearic acid methyl ester) was removed by aspirated filtration. 50 grams of the epoxidized CE-1897 was mixed with 17 grams of acrylic acid, 0.5 grams of AMC-2 chromium (III) catalyst and 0.15 grams hydroquinone at 500 rpm for 6 hours at 90° C. The reaction product was cleaned as in Example 1. The viscosity of the acrylated CE-1897 (ACE1897) was measured to be 180 mPAs. The ACE1897 had a dark green color due to the presence of residual chromium (III) catalyst and had a transmittance (% T) of 0.1 (4 mm path length) at 350 nm, 4.5% T at 420 nm and 13.4% T at 450 nm. A pressure sensitive adhesive formulation and tape were made by mixing the acrylated CE-1897 (ACE1897), IOA and IRGACURE 651 at 50%, 50% and 0.2 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had a 178 micron (0.007 inches) coating thickness. The gel fraction was measured to be 0.92.

Example 13

A pressure sensitive adhesive formulation and tape were made as in Example 12 by mixing the chromium(III) catalyzed ACE1897, IOA, IRGACURE 651 and a chain transfer agent IOTG at 50%, 50%, 0.2 parts per hundred monomer (pphm) and 0.2 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had an 89 micron (0.0035 inches) coating thickness. The gel fraction was measured to be 0.87.

Example 14

A pressure sensitive adhesive formulation and tape were made as in Example 13 by mixing the chromium(III) catalyzed ACE1897, IOA, IRGACURE 651 and a chain transfer agent IOTG at 50%, 50%, 0.2 parts per hundred monomer (pphm) and 0.5 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had an 89 micron (0.0035 inches) coating thickness. The gel fraction was measured to be 0.67.

Example 15

A pressure sensitive adhesive formulation and tape were made as in Example 13 by mixing the chromium(III) catalyzed ACE1897, IOA, IRGACURE 651 and a chain transfer agent IOTG at 50%, 50%, 0.2 parts per hundred monomer (pphm) and 0.75 parts per hundred monomer (pphm), respectively. The composition was placed between a 38 micron (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had an 89 micron (0.0035 inches) coating thickness. The gel fraction was measured to be 0.51.

Example 16

A pressure sensitive adhesive formulation and tape were made as in Example 13 by mixing the chromium(III) catalyzed ACE1897, IOA, IRGACURE 651 and a chain transfer agent IOTG at 50%, 50%, 0.2 parts per hundred monomer (pphm) and 1.0 parts per hundred monomer (pphm), respectively. The composition was placed between a 38 microns (0.0015 inches) thickness PET film and a 51 micron (0.002 inches) thickness siliconized PET film and drawn through a knife coater with a gap set at 178 microns (0.007 inches). The composition was exposed to the output from two Sylvania F20T12/350/BL/50 W lamps for 6 minutes. The composition had an 89 micron (0.0035 inches) coating thickness. The gel fraction was measured to be 0.14.

TABLE 1

Adhesive Compositions

| Example | Acrylate monomer (% w) | IOA (% w) | AA (% w) | IOTG (% w) | Photo initiator (% w) |
|---|---|---|---|---|---|
| 1 | 47.5 (AMO) Cr(III) cat. | 47.5 | 5.0 | — | Irgacure 651 (0.2 pphm) |
| 2 | 67.5 (AMO) Cr(III) cat. | 22.5 | 10.0 | — | Irgacure 651 (0.2 pphm) |
| 3 | 47.5 (AMO) Cr(III) cat. | 47.5 | 5.0 | — | Irgacure 819 (0.5 pphm) |
| 4 | 46.5 (AMO) Cr(III) cat. | 46.5 | 7.0 | — | Irgacure 819 (0.5 pphm) |
| 5 | 60.0 (AMO) Cr(III) cat. | 30.0 | 10.0 | — | Irgacure 819 (0.5 pphm) |
| 6 | 70.0 (AMO) Cr(III) cat. | 20.0 | 10.0 | — | Irgacure 819 (0.5 pphm) |
| 7 | 80.0 (AMO) Cr(III) cat. | 10.0 | 10.0 | — | Irgacure 819 (0.5 pphm) |
| 8 | 50.0 (AMO) Cr(III) cat. | 50.0 | — | — | Irgacure 651 (0.2 pphm) |
| 9 | 50.0 (AMO) Imidazole Cat. | 50.0 | — | — | Irgacure 651 (0.2 pphm) |
| 10 | 10.0 (AMO) Cr(III) cat. | 88.0 | 2.0 | — | Irgacure 651 (0.2 pphm) |
| 11 | 88.0 (AMO) Cr(III) cat. | 10.0 | 2.0 | — | Irgacure 651 (0.2 pphm) |
| 12 | 50.0 (ACE1897) Cr (III) cat. | 50.0 | — | — | Irgacure 615 (0.2 pphm) |
| 13 | 50.0 (ACE1897) Cr (III) cat. | 50.0 | — | 0.20 pphm | Irgacure 615 (0.2 pphm) |
| 14 | 50.0 (ACE1897) Cr (III) cat. | 50.0 | — | 0.50 pphm | Irgacure 615 (0.2 pphm) |
| 15 | 50.0 (ACE1897) Cr (III) cat. | 50.0 | — | 0.75 pphm | Irgacure 615 (0.2 pphm) |
| 16 | 50.0 (ACE1897) Cr (III) cat. | 50.0 | — | 1.0 pphm | Irgacure 615 (0.2 pphm) |
| C1 | 12.0 (ESOA) | 88.0 | — | — | Irgacure 651 (0.2 pphm) |
| C2 | 5.0 (ESOA) | 95.0 | — | — | Irgacure 651 (0.2 pphm) |
| C3 | — | 90.0 | 10.0 | — | Irgacure 651 (0.2 pphm) |
| C4 | 90.0 (AMO) Cr(III) cat. | — | 10.0 | — | Irgacure 651 (0.2 pphm) |
| C5 | — | 95.0 | 5.0 | — | Irgacure 651 (0.2 pphm) |
| C6 | 90.0 (AMO) Cr(III) cat. | — | 10.0 | — | Irgacure 819 (0.5 pphm) |

Electron Beam Treatment

Tapes made from the above adhesives were crosslinked to increase their cohesive strength by subjecting them to electron beam (Ebeam) bombardment using the following procedure. Tape specimens were adhered to a 50.8 micrometer (0.002 inches) thick polyethylene terephthalate carrier web moving at a speed of 9.1 meters (30 feet) per minute with adhesive side up. The samples were exposed to a 175 kV accelerating voltage in an inert nitrogen atmosphere at a calculated dose of 2 Megarads (Mrads) using an ELECTROCURTAIN Model CB-175 (Energy Sciences Incorporated, Wilmington, Del.) electron beam device.

TABLE 2

| | Tape Properties | | | |
| --- | --- | --- | --- | --- |
| | Without Ebeam | | With Ebeam | |
| Example | 180° Peel (N/cm) | % adhesive transfer | 180° Peel (N/cm) | % adhesive transfer |
| 1 | 3.4 | 0 | 2.3 | 0 |
| 2 | 3.9 | 0 | 3.7 | 0 |
| 3 | 7.7 | 45 | 2.5 | 0 |
| 4 | 3.6 | 0 | 3.3 | 0 |
| 5 | 3.7 | 0 | 3.7 | 0 |
| 6 | 3.2 | 0 | 2.8 | 0 |
| 7 | 1.6 | 98 | 2.2 | 93 |
| 8 | 3.4 | 0 | — | — |
| 9 | 0.8 | 0 | — | — |
| 10 | 9.9 | 0 | — | — |
| 11 | 4.2 | 0 | — | — |
| 12 | 0.1 | 0 | — | — |
| 13 | 0.1 | 0 | — | — |
| 14 | 0.1 | 0 | — | — |
| 15 | 0.2 | 0 | — | — |
| 16 | 0.3 | 0 | — | — |
| C1 | — | — | — | — |
| C2 | — | — | — | — |
| C3 | 4.2 | 0 | 4.4 | 0 |
| C4 | — | — | — | — |
| C5 | 4.6 | 0 | 3.9 | 0 |
| C6 | 3.1 | 93 | 1.9 | 95 |

Where "—" means that the sample was not or could not be tested.

TABLE 3

| | Tape Properties | |
| --- | --- | --- |
| Example | Without Ebeam Shear Hang Time (min) | With Ebeam Shear Hang Time (min) |
| 1 | 5 | 105 |
| 2 | 927 | 10,000+ |
| 3 | 3 | 74 |
| 4 | 7 | 14 |
| 5 | 37 | 45 |
| 6 | 11 | 15 |
| 7 | 39 | 44 |
| 8 | 38 (50% coh) | — |
| 9 | 22 | — |
| 10 | 8 | — |
| 11 | 46 (30% coh) | — |
| 12 | 713 (0% coh) | — |
| 13 | 2800+ | — |
| 14 | 2800+ | — |
| 15 | 154 (25% coh) | — |
| 16 | 28 (50% coh) | — |
| C1 | — | — |
| C2 | — | — |
| C3 | 8810 | 10,000+ |
| C4 | — | — |
| C5 | 118 | 2437 |
| C6 | 5 | 6 |

Where "—" means that the sample was not or could not be tested.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

I claim:

1. An ultraviolet radiation-polymerizable composition comprising:

(a) an acrylated monounsaturated fatty acid alkyl ester represented by the following general formula:

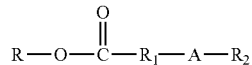

wherein
R is an alkyl group,
$R_1$ is an alkylene group,
$R_2$ is an alkyl group or H,
A is represented by one of the following general formulae:

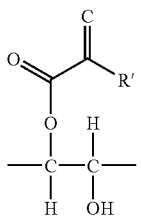 or 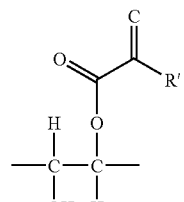

wherein R' is H or $CH_3$,
and —$R_1$-A-$R_2$ has from about 14 to about 22 carbon atoms in the catenary chain;

(b) a monoethylenically unsaturated (meth)acrylic acid ester of a non-tertiary alkyl alcohol in which the alkyl group has from 1 to 20 carbon atoms; and from about 0.01 to about 5 parts by weight of a photoinitiator per 100 parts by weight of said composition wherein said photoinitiator is absorbent to ultraviolet radiation in the wavelength range of from 380 to 450 nm.

2. The ultraviolet radiation-polymerizable composition of claim 1 wherein —$R_1$-A-$R_2$ has from 16 to 18 carbon atoms in the catenary chain.

3. The ultraviolet radiation-polymerizable composition of claim 1 wherein R is an alkyl group having from 1 to 12 carbon atoms.

4. The ultraviolet radiation-polymerizable composition of claim 3 wherein R is a methyl group.

5. The ultraviolet radiation-polymerizable composition of claim 1 wherein the acrylated fatty acid alkyl ester is selected from the group consisting of acrylated methyl palmitoleate and acrylated methyl oleate.

6. The ultraviolet radiation-polymerizable composition of claim 5 wherein the acrylated fatty acid alkyl ester is acrylated methyl oleate.

7. The ultraviolet radiation-polymerizable composition of claim 1 wherein the acrylated fatty acid alkyl ester is derived from a renewable resource.

8. The ultraviolet radiation-polymerizable composition of claim 7 wherein the acrylated fatty acid alkyl ester is derived from plant oil.

9. The ultraviolet radiation-polymerizable composition of claim 8 wherein the acrylated fatty acid alkyl ester is derived from a plant oil selected from the group consisting of canola oil, olive oil, palm oil, and high oleic acid content soybean oil.

10. The ultraviolet radiation-polymerizable composition of claim 1 wherein the (meth)acrylic acid ester has from 3 to 18 carbon atoms.

11. The ultraviolet radiation-polymerizable composition of claim 10 wherein the (meth)acrylic acid ester has from 4 to 12 carbon atoms.

12. The ultraviolet radiation-polymerizable composition of claim 1 wherein the (meth)acrylic acid ester is selected from the group consisting of n-butyl acrylate, 2-ethylhexyl acrylate, and iso-octyl acrylate.

13. The ultraviolet radiation-polymerizable composition of claim 1 wherein the photoinitiator is selected from the group consisting of bisacyl phosphine and 2,2-diethoxyacetophenone.

14. The ultraviolet radiation-polymerizable composition of claim 1 further comprising a chain transfer agent.

15. The ultraviolet radiation-polymerizable composition of claim 14 wherein the chain transfer agent is selected from the group consisting of isooctylthioglycolate and carbon tetrabromide.

16. The ultraviolet radiation-polymerizable composition of claim 1 further comprising a crosslinking agent.

17. The ultraviolet radiation-polymerizable composition of claim 16 wherein the crosslinking agent is selected from the group consisting of 1,6-hexanediol diacrylate, trimethylolpropane triacrylate, and 2,4-bis(trichloromethyl)-6-(4-methoxyphenyl)-s-triazine.

18. The ultraviolet radiation-polymerizable composition of claim 1 further comprising acrylic acid.

19. The ultraviolet radiation-polymerizable composition of claim 1 wherein the reaction product of components (a), (b), and (c) is a pressure sensitive adhesive.

20. The ultraviolet radiation-polymerizable composition of claim 1 wherein the ultraviolet radiation-polymerizable composition has been crosslinked with electron beam energy.

21. A pressure sensitive adhesive prepared by exposing the ultraviolet radiation-polymerizable composition of claim 1 to ultraviolet radiation.

22. The pressure sensitive adhesive of claim 21 wherein the ultraviolet radiation-polymerizable composition is exposed to ultraviolet radiation having a wavelength from 380 nm to 450 nm.

23. A method for making a pressure sensitive adhesive composition comprising:
   (a) combining (i) the ultraviolet radiation-polymerizable composition of claim 1 and (ii) a packaging material to form a packaged ultraviolet radiation-polymerizable composition;
   (b) exposing the ultraviolet radiation-polymerizable composition to ultraviolet radiation to polymerize the ultraviolet radiation-polymerizable composition to form a packaged pressure sensitive adhesive composition.

24. The method of claim 23 wherein the packaging material is meltable and mixable with the pressure sensitive adhesive composition so as to provide a coatable pressure sensitive adhesive composition when the packaged pressure sensitive adhesive composition is melted.

25. The method of claim 23 further comprising melting the packaged pressure sensitive adhesive composition.

26. The method of claim 23 wherein the percent transmission in the range of from 380 to 450 nm of the ultraviolet radiation-polymerizable composition is higher than the percent transmission in the range of from 380 to 450 nm of the acrylated monounsaturated fatty acid alkyl ester.

27. The ultraviolet radiation-polymerizable composition of claim 1 wherein the percent transmission in the range of from 380 to 450 nm of the composition is higher than the percent transmission in the range of from 380 to 450 nm of the acrylated monounsaturated fatty acid alkyl ester.

\* \* \* \* \*

UNITED STATES PATENT AND TRADEMARK OFFICE
CERTIFICATE OF CORRECTION

PATENT NO.        : 7,981,988 B2
APPLICATION NO.   : 11/420288
DATED             : July 19, 2011
INVENTOR(S)       : Patrick Darby Hyde It is certified that error appears in the above-identified patent and that said Letters Patent is hereby corrected as shown below:

In the Specification

Column 3
Line 35; Delete "eruceate." and insert -- eructate --, therefor.

Column 4
Line 40; Delete "cyclobenyzl" and insert -- cyclobenzyl --, therefor.

Column 6
Line 13; Delete "tetracrylate," and insert -- tetraacrylate, --, therefor.

Column 13
Line 62; After "inch$^2$" insert -- ). --.

Column 14
Line 27; Delete "grams/meter$_2$" and insert -- grams/meter$^2$ --, therefor.
Line 27; After "inch$^2$" insert -- ). --.
Line 62; Delete "grams/meter$_2$" and insert -- grams/meter$^2$ --, therefor.
Line 62; After "inch$^2$" insert -- ). --.

Signed and Sealed this
First Day of October, 2013

Teresa Stanek Rea
*Deputy Director of the United States Patent and Trademark Office*